United States Patent [19]

Flanagan

[11] 4,374,304
[45] Feb. 15, 1983

[54] SPECTRUM DIVISION/MULTIPLICATION COMMUNICATION ARRANGEMENT FOR SPEECH SIGNALS

[75] Inventor: James L. Flanagan, Warren, N.J.

[73] Assignee: Bell Telephone Laboratories, Incorporated, Murray Hill, N.J.

[21] Appl. No.: 190,993

[22] Filed: Sep. 26, 1980

[51] Int. Cl.$^3$ ............................................. G10L 1/00
[52] U.S. Cl. ........................................... 179/15.55 R
[58] Field of Search ................. 179/15.55 R, 15.55 T, 179/1.5 A; 370/118; 455/110; 360/8

[56] References Cited

U.S. PATENT DOCUMENTS

| | | | |
|---|---|---|---|
| 3,349,184 | 10/1967 | Morgan | 179/15.55 |
| 3,360,610 | 12/1967 | Flanagan | 179/15.55 |
| 3,484,556 | 12/1969 | Flanagan et al. | 179/15.55 |
| 3,510,597 | 5/1970 | Williamson | 179/15.55 |
| 3,541,266 | 11/1970 | Klayman | 179/15.55 |
| 4,086,431 | 4/1978 | Franssen et al. | 179/1.5 A |

OTHER PUBLICATIONS

Bogner et al, "Frequency Multiplication of Speech Signals", IEEE Trans. on Audio, Sep. 1969, pp. 202–208.

Primary Examiner—Emanuel S. Kemeny
Attorney, Agent, or Firm—Jack S. Cubert; Kurt C. Olsen

[57] ABSTRACT

In a speech communication system, an input speech signal is partitioned into a plurality of subband portions. Responsive to each subband portion, a signal of lesser bandwidth representative of the subband portion is generated by dividing the instantaneous phase of the subband by an integer k. Where k=2, for example, the center frequency and bandwidth of each subband is halved. The lesser bandwidth subband portion representative signals are combined to form a compressed bandwidth signal representative of the input speech signal. A replica of the input speech signal is formed by partitioning the compressed bandwidth signal into subband portions thereof; converting each compressed signal subband portion into a signal representative of a subband of the input speech signal; and combining the converted subband representative signals into a single speech signal replica.

15 Claims, 11 Drawing Figures

SPECTRUM DIVISION/MULTIPLICATION COMMUNICATION ARRANGEMENT FOR SPEECH SIGNALS

My invention relates to speech processing and, more particularly, to bandwidth compression of speech signals.

In speech processing arrangements, it is desirable to minimize the bandwidth of signals prior to application to communication channels or recording media. The reduced bandwidth signals allow more efficient utilization of such communication channels and recording media. In one type of bandwidth compression arrangement, disclosed in U.S. Pat. No. 3,349,184 issued Oct. 24, 1967, all frequency components of the signal spectrum are divided by a factor n to reduce the signal bandwidth. Restoration of the original bandwidth is accomplished by multiplying all frequency components of the reduced signal spectrum by the factor n. It has been found, however, that division and/or multiplication of the entire signal spectrum can result in severe distortion of important frequency components thereof. The limitations of these frequency multiplication arrangements are discussed in the article "Frequency Multiplication of Speech Signals" by R. C. Bogner and J. L. Flanagan in the *IEEE Transactions on Audio and Electroacoustics*, Vol. Au-17, No. 3, Sept. 1969, pp. 202–208.

Another arrangement to reduce the bandwidth of a speech signal is disclosed in U.S. Pat. 3,360,610 issued to J. L. Flanagan Dec. 26, 1967 and assigned to the same assignee. The scheme utilizes the spectrum analysis of the well known channel vocoder but avoids the difficulties in determining excitation source characteristics. At each of a plurality of selected frequencies over the short-term speech signal spectrum, a pair of signals is generated. One signal represents the short-term amplitude spectrum at the selected frequency. The other signal represents the time derivative of the short-term phase spectrum at the selected frequency. The plurality of narrow band representative signals are supplied to a communication channel.

At a receiver, the pair of representative signals is used in a combined amplitude and frequency modulation arrangement to recover a close approximation of the original speech spectrum. While the distortion effects of frequency division and multiplication of the entire speech spectrum are avoided, the use of the time derivative of the short-term phase spectrum affects the accuracy of the transmitted phase information. Additionally, each representative signal is transmitted separately so that the complexity of the coding and transmission arrangement is increased. It is an object of the invention to provide an improved bandwidth compression arrangement that avoids distortion of important frequency components and obviates the need for transmission of a plurality of separate signals.

BRIEF SUMMARY OF THE INVENTION

The invention is directed to a speech communication arrangement in which the short-term frequency spectrum of a speech signal is partitioned into a plurality of subband components. A first signal of lesser bandwidth representative of each subband is formed by dividing the instantaneous phase of each subband by an integer k. Where k=2, for example, the center frequency and bandwidth of each subband is halved. The subband representative first signals are combined to form a lesser bandwidth signal corresponding to the short-term speech signal spectrum.

According to one aspect of the invention the short-term spectrum of the lesser bandwidth signal is divided into portions corresponding to said subbands. A set of second signals representative of the subband components are produced responsive to the said lesser bandwidth signal spectrum portions. The second signals are combined to form a replica of the short-term spectrum of the input speech signal.

BRIEF DESCRIPTION OF THE DRAWINGS

FIG. 5 shows a detailed block diagram of a circuit that may be used in the receiver band selector circuits of FIG. 1;

THEORETICAL CONSIDERATIONS

As is well known in the art a speech signal s(t) has a short-term spectrum that may be represented as $$s(\omega,t) = a(\omega,t) - jb(\omega,t) = S(\omega,t)e^{j\Phi(\omega,t)} \qquad (1)$$

where $\omega$ is the radian frequency, $$a(\omega,t) = \int_{-\infty}^{t} s(\lambda)h(t-\lambda)\cos\omega\lambda\, d\lambda \qquad (2)$$

$$b(\omega,t) = \int_{-\infty}^{t} s(\lambda)h(t-\lambda)\sin\omega\lambda\, d\lambda \qquad (3)$$

and h(t) is the impulse response of a physically realizable filter for which the Fourier transform $H(j\omega)=0$, $\omega > \omega/2$. The short-term amplitude spectrum for signal s(t) in terms of the $a(\omega,t)$ and $b(\omega,t)$ coefficient is $$s(\omega,t) = [a^2(\omega,t) + b^2(\omega,t)]^{\frac{1}{2}} \qquad (4)$$

and the short-term phase spectrum for the signal is $$\Phi(\omega,t) = \tan^{-1}\left[\frac{-b(\omega,t)}{a(\omega,t)}\right]. \qquad (5)$$

The short-term spectrum may be partitioned into subbands $s_n(t)$ where $n=1,2,\ldots,N$ which can be contiguous. For each subband $$s_n(t) = S(\omega_n,t) \cos\theta(\omega_n,t) \tag{6}$$

$$= a(\omega_n,t)\cos\omega_n t + b(\omega_n,t)\sin\omega_n t \tag{7}$$

where the real valued signal $s_n(t)$ is the output of a bandpass filter of bandwidth W centered on frequency $\omega_n$. The speech signal $s(t)$ can be approximated by $$s(t) = \sum_n s_n(t). \tag{8}$$

It is possible to reduce the bandwidth of the speech signal by transforming each signal $s_n(t)$ into a signal $$s_{n/k}(t) = S(\omega_n,t)\cos\frac{\theta(\omega_n,t)}{k}. \tag{9}$$

As indicated in Equation 9 the instantaneous phase of signal $s_n(t)$ is divided by a constant k. The frequency divided bandpass signal then has the same time envelope as the original signal $s_n(t)$ but exhibits an instantaneous phase which is divided by k. Summation of signals $s_{n/k}(t)$ in accordance with $$\tilde{s}(t) = \sum_n s_{n/k}(t) \tag{10}$$

results in a reduced bandwidth representation of the speech signal if the band occupancy of signal $s_{n/k}(t)$ is less than W, the bandpass of the subband signal $s_n(t)$. The reduced bandwidth signal $s(t)$ can therefore be transmitted through a narrower channel than the original signal $\tilde{s}(t)$. Alternatively, it can be digitized and transmitted at a lower bit rate than can be used for the original signal. Where the envelope and the phase of the transformed signal of Equation 9 are relatively slowly varying functions of time in comparison to $\omega_n t$, the signal $s_n(t)$ can be characterized as a quasi-steady state cosine wave for which the band occupancy of signal $s_{n/k}(t)$ ideally approaches W/k.

Figure 8:
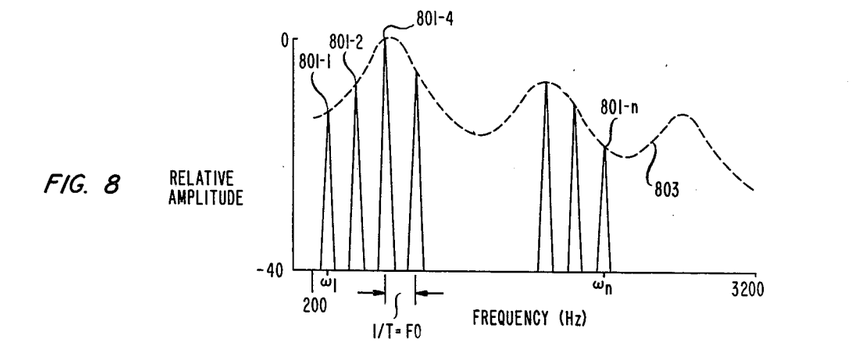
FIGS. 8–10 show waveforms illustrating the operation of the circuit of FIG. 1.

The traditional spectral model of a quasiperiodic voiced sound is illustrated in FIG. 8. The spectrum is composed of finite width "teeth" (waveforms 801-1 through 801-N) which are spaced at the fundamental pitch frequency. The spectrum envelope with its characteristic formant structure is shown in waveform 803. The amplitude of each tooth in FIG. 8 is conditioned by the resonance structure of the vocal tract which changes relatively slowly as successive phonemes are articulated. In similar manner, the voice pitch changes relatively slowly to produce the inflection and prosody appropriate to connected speech utterances. The simultaneous amplitude and phase modulations determine the width of the spectral teeth.

Figure 9:
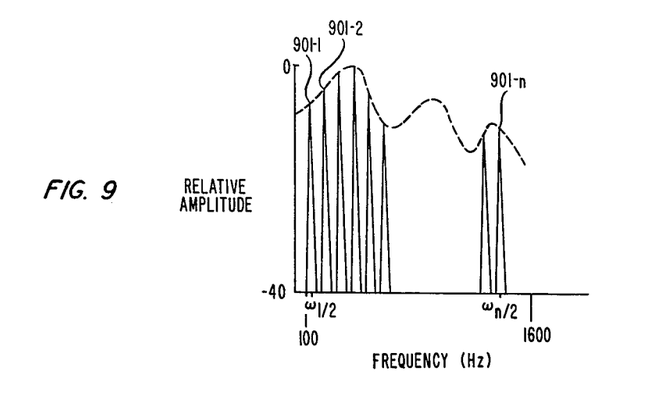
Figure 10:
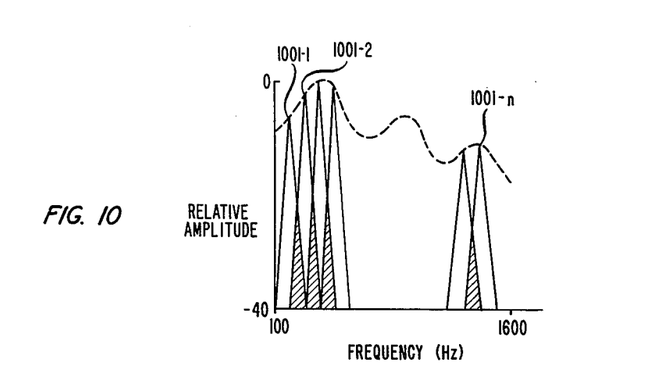

As is well known in the art, the band occupancy of the amplitude modulation of speech spectral components is on the order of ±25 hertz. Similarly, there is comparable occupancy for the phase modulation. The typical pitch frequency for a man is of the order of 125 hertz. Consequently there are useful gaps between the teeth in the speech spectrum as illustrated in FIG. 8. The existence of these gaps and the fact that the teeth may be considered quasi-steady sinusoids results in a frequency division spectrum occupying 1/k the original spectrum space as indicated in FIG. 9. The frequency division of Equation 9 is distinct from a linear scaling of the signal frequencies i.e., $\omega_n/k$. Linear scaling translates the teeth to lower portions in frequency without narrowing the modulated width of the teeth so that spectral overlap illustrated in FIG. 10 results. Frequency division in accordance with the invention narrows the pitch teeth whereby band compression is obtained without the internal aliasing of the linear scaling.

The frequency division defined in Equation 9 may be accomplished by modifying and combining the in phase and quadrature phase components of the short-term spectrum, i.e., $a(\omega,t)$ and $b(\omega,t)$. In the case where $k=2$ and the spectrum amplitude is defined for purposes of simplification as $$A_n = [S(\omega_n,t)], \tag{11}$$

dividing the instantaneous phase of the subband signal $s_n(t)$ results in $$s_{n/2}(t) = A_n \cos\left[\frac{\omega_n t}{2} + \frac{\Phi}{2}\right] \tag{12}$$

$$= a_{n/2}\cos\frac{\omega_n t}{2} + b_{n/2}\sin\frac{\omega_n t}{2} \tag{13}$$

where the explicit notation has been abbreviated to represent $a(\omega_n,t)$ as $a_n$ and $b(\omega_n,t)$ as $b_n$ and where the inphase and quadrature quantities are related by $$a_n = A_n\cos\Phi_n \qquad a_{n/2} = A_n\cos\frac{\Phi_n}{2} \tag{14}$$

$$b_n = A_n\sin\Phi_n \qquad b_{n/2} = A_n\sin\frac{\Phi_n}{2}.$$

In accordance with the well known fractional trigonometric relationships $$\cos\frac{\Phi_n}{2} = (SGN)_a\sqrt{\frac{1+\cos\Phi_n}{2}} \text{ and} \tag{15}$$

$$\sin\frac{\Phi_n}{2} = (SGN)_b\sqrt{\frac{1-\cos\Phi_n}{2}}. \tag{16}$$

Consequently $$a_{n/2} = (SGN)_a\sqrt{\frac{A_n}{2}}\sqrt{A_n+a_n} \tag{17}$$

$$b_{n/2} = (SGN)_b\sqrt{\frac{A_n}{2}}\sqrt{A_n-a_n}. \tag{18}$$

The values of $(SGN)_a$ and $(SGN)_b$ must be selected to be consistent with the quadrant of $\Phi_{n/2}$. The manner in which the (SGN) values are controlled is as follows. The sign of $a_{n/2}$ is changed whenever the sign of $b_n$ changes and $a_n$ is negative. The sign of $b_{n/2}$ is changed whenever the sign of $b_n$ changes and $a_n$ is positive. The $a_{n/2}$ and $b_{n/2}$ components of Equations 17 and 18 are combined in accordance with Equation 13 to form the lesser bandwidth subband representative signal $s_{n/2}(t)$. The sum of reduced bandwidth $s_{n/2}(t)$ signals for $n=1,2,\ldots,N$, is representative of speech signal $s(t)$ but is a "half bandwidth" spectrum as illustrated in FIG. 9.

The replica of the original signal s(t) is produced by an inverse multiplication of the received reduced bandwidth signal $\hat{s}'(t)$ which in the absence of transmission errors is identical to $$\sum_n s_{n/2}(t) \cdot s'_{n/2} = a'_{n/2} \cos \frac{\omega_n t}{2} + b'_{n/2} \sin \frac{\omega_n t}{2} \quad (19)$$

where $s'_{n/2}$, $a'_{n/2}$, $b'_{n/2}$, and $A'_n$ are characteristic of the received signal. The subband replica signal is $$s'_n(t) = a'_n \cos \omega_n t + b'_n \sin \omega_n t \quad (20)$$

where $$a'_n = A'_n \cos 2\Phi'_n; \quad (21)$$

$$b'_n = -A'_n \sin 2\Phi'_n; \quad (22)$$

and $$\Phi'_n = \tan^{-1} \frac{-b_{n/2}}{a_{n/2}}.$$

From the trigonometric relationships $$\cos 2\Phi'_n = (2 \cos^2 \Phi'_n - 1) \quad (23)$$

and $$\sin 2\Phi'_n = (2 \cos \Phi'_n \sin \Phi'_n), \quad (24)$$

$$a'_n = A'_n \left[ \frac{2 a'^2_{n/2}}{A'^2_n} - 1 \right] \quad (25)$$

and $$b'_n = A'_n \left[ \frac{2 a'_{n/2} b'_{n/2}}{A'^2_n} \right]. \quad (26)$$

Combining Equations 20 through 26 results in $$s'_n(t) = 2A'_n \left[ \left( \frac{a'^2_{n/2}}{A'^2_n} - \tfrac{1}{2} \right) \cos \omega_n t + \left( \frac{a'_{n/2} b'_{n/2}}{A'^2_n} \right) \sin \omega_n t \right]. \quad (27)$$

The replica signal is then $$\tilde{s}(t) = \sum_n s'_n(t). \quad (28)$$

The recovery and restoration of the speech signal based on this spectral model is, of course, dependent on adequate frequency resolution in reanalyzing the signal and spectral multiplication of the reanalyzed signal in accordance with Equations 20 through 26. Unvoiced sounds, to the extent they are characterized by random noise-like spectra, are reproduced as acceptably as quasi-periodic sounds. It is also apparent that the values of $\omega_n$ must be spaced closely enough to resolve voiced-sound periodicity. For linear spacing in frequency $$(\omega_n - \omega_{n-1}) = \Delta \omega_n \leq \omega_0 \quad (29)$$

where $\omega_0$ is the radian frequency of the fundamental voice pitch.

DETAILED DESCRIPTION

Figure 1:
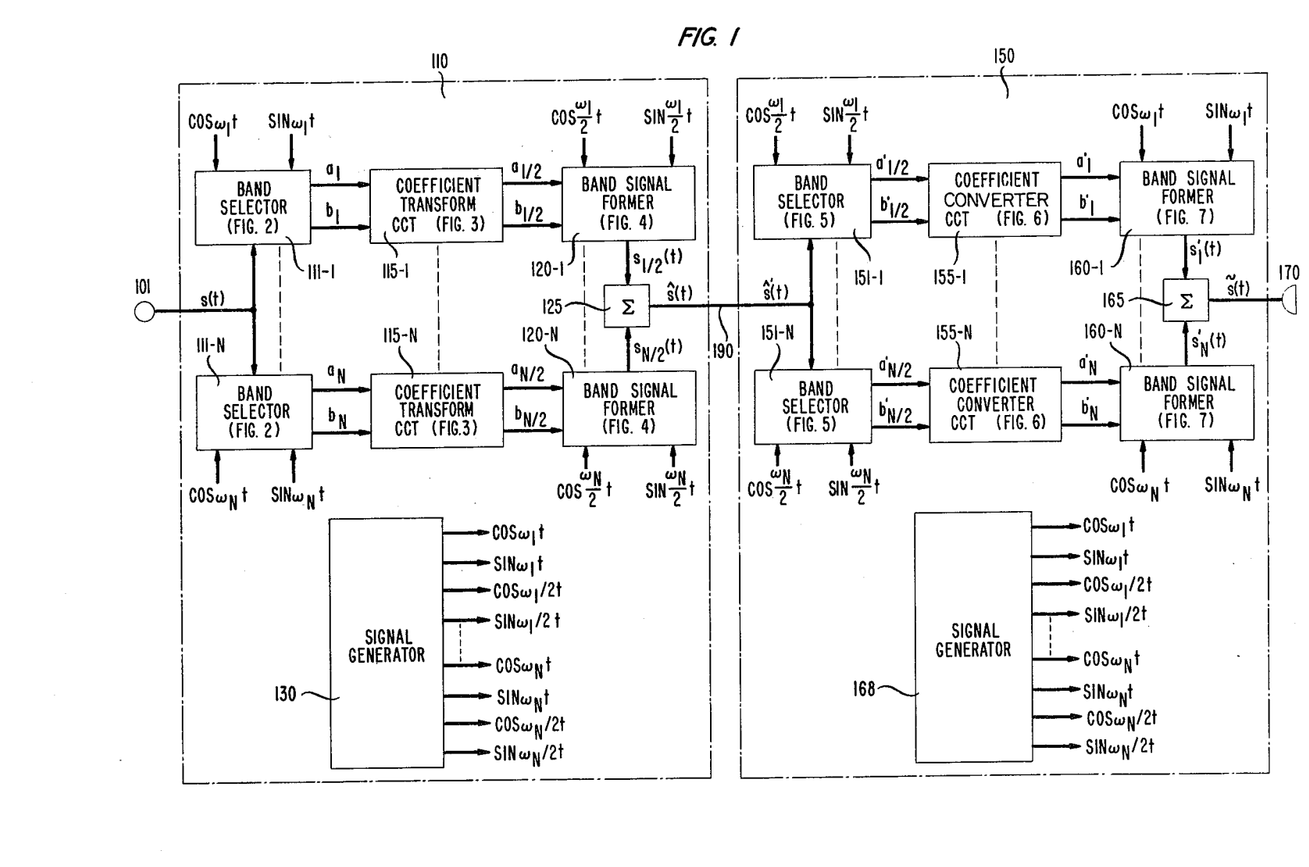
FIG. 1 depicts a general block diagram of a speech communication arrangement illustrative of the invention.

FIG. 1 shows a general block diagram of a frequency division/multiplication communication arrangement illustrative of the invention. Referring to FIG. 1, a speech signal s(t) from transducer 101 is supplied to transmitter circuit 100. Transmitter circuit 110 comprises a set of band selectors 111-1 through 111-N, coefficient transform circuits 115-1 through 115-N, band signal former circuits 120-1 through 120-N and summing circuit 125. The transmitter band selectors are operative to partition the speech signal s(t) into N distinct and preferably contiguous subbands. The subbands are arranged to cover the short-term spectrum of speech signal s(t). The lowest frequency range subband is centered at radian frequency $\omega_1$. The highest frequency range subband range is centered at radian frequency $\omega_N$, e.g., 3200 Hz. A sufficient number of subbands are included so that each pitch tooth of the speech signal short-term spectrum is within a single subband as indicated in FIG. 8.

Responsive to the speech signal s(t), band selector 111-1 produces a pair of coefficient signals $a_1$ and $b_1$. $a_1$ corresponds to the n=1 coefficient of the cosine term of Equation 7 while $b_1$ corresponds to the coefficient of the sine term of Equation 7. In similar manner, band selector 111-N generates signals $a_N$ and $b_N$. $a_N$ and $b_N$ are the coefficients of the cosine and sine terms, respectively, in Equation 7 for n=N. Signals $a_2$, $b_2$ through $a_{N-1}$, $b_{N-1}$, are produced by band selectors 111-2 and 111-N-1 (not shown in FIG. 1).

Figure 2:
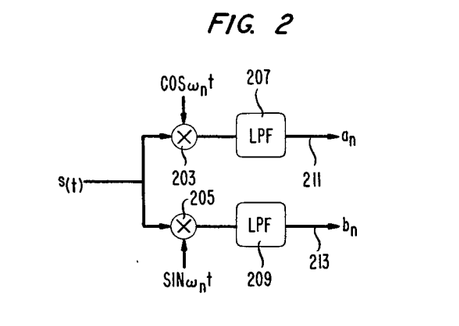
FIG. 2 shows a detailed block diagram of a circuit that may be used in the transmitter band selectors of FIG. 1.

A circuit useful as one of band selectors 111-1 through 111-N is illustrated in FIG. 2. Referring to FIG. 2, input speech signal s(t) is supplied to one input of multiplier circuit 203 and to one input of multiplier circuit 205. A constant amplitude cosine wave of frequency $\omega_n$ (n=1,2, ..., N), generated in signal generator 130, is applied to the other input of multiplier 203. Similarly, a constant amplitude sine wave signal of frequency $\omega_n$ is applied from generator 130 to the other input of multiplier 205. As is well known in the art, multiplier 203 is effective to modulate signal s(t) whereby the band center frequency of the band $\omega_n$ is shifted to zero frequency. Low-pass filter 207 is operative to limit the bandpass of the signal from multiplier 203 to the range zero to +W/2 whereby the filter output is the inphase or real part of the signal in the subband centered at $\omega_n$. In like manner, low-pass filter 209 operates to provide the coefficient $b_n$ which represents the quadrature phase or imaginary part of the subband centered at radian frequency $\omega_n$ and shifted to $\omega=0$.

Figure 3:
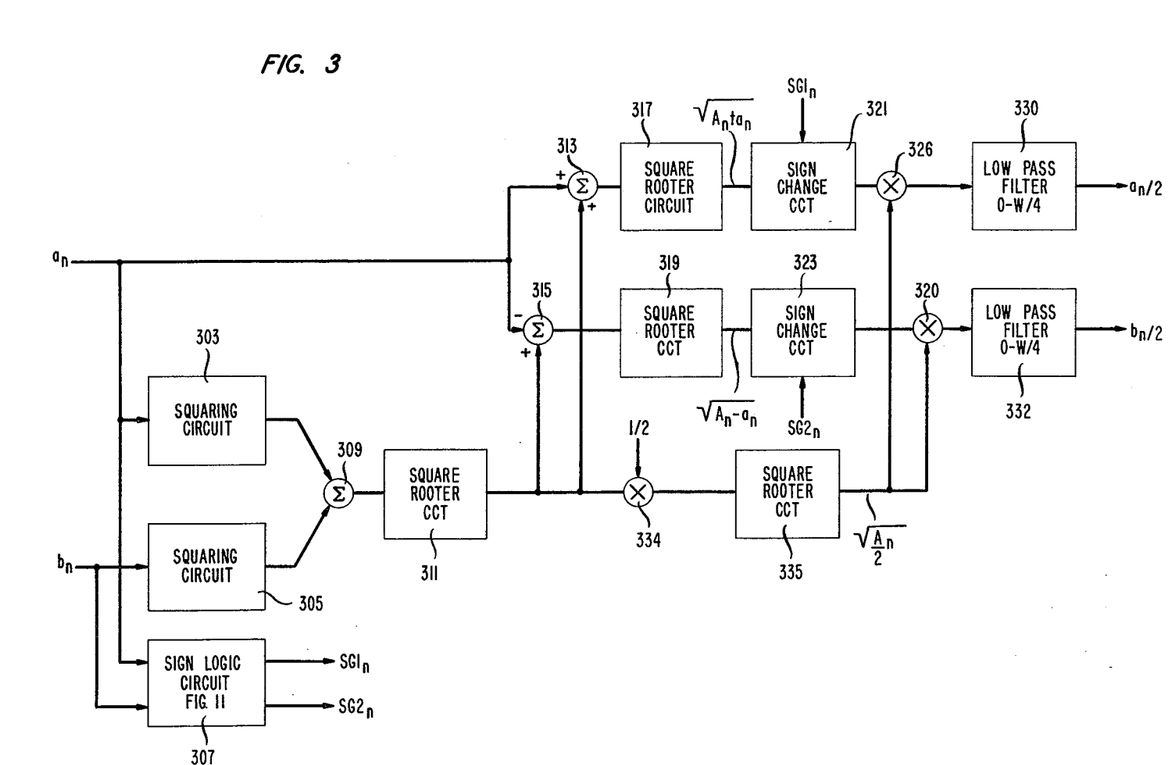
FIG. 3 shows a detailed block diagram of a circuit that may be used in the coefficient transform circuits of FIG. 1.

The inphase and quadrature phase outputs of each band selector $a_n$ and $b_n$ are supplied to a corresponding coefficient transformation circuit of circuits 115-1 through 115-N. These coefficient transformation circuits are operative to transform the coefficient signals $a_n$ and $b_n$ into half-bandwidth coefficient signals $a_{n/2}$ and $b_{n/2}$ in accordance with Equations 17 and 18. The circuit arrangement of FIG. 3 may be utilized to produce the half-bandwidth coefficient signals in accordance with Equations 17 and 18. In FIG. 3, the signal $a_n$ from the corresponding band selector is applied to squaring circuit 303, summing circuits 313 and 315, and to sign logic circuit 307. Coefficient signal $b_n$ is applied to squaring circuit 305 and sign logic circuit 307. The outputs of squaring circuits 303 and 305 are summed in adder circuit 309 and the amplitude signal $$A_n = \sqrt{a_n^2 + b_n^2} \tag{30}$$

is formed in squre rooter circuit 311. Adder circuit 313 sums the coefficient signal $a_n$ with the amplitude signal $A_n$. The square root of the $A_n + a_n$ signal is obtained from circuit 317. In accordance with Equation 15, the sign of the signal $\sqrt{A_n + a_n}$ is determined in sign logic circuit 307 and the signal $SG1_n$ representing the sign is supplied to sign change circuit 321. Multiplier 334 and square rooter circuit 335 are operative to form the signal $$\sqrt{\frac{A_n}{2}} \tag{31}$$

and signal $$\sqrt{\frac{A_n}{2}}$$

is multiplied by the output of sign change circuit 321 in multiplier 326. In this manner, coefficient signal $a_{n/2}$ is formed in accordance with Equation 17. Low-pass filter 330 restricts the output of multiplier 326 to the bandpass zero through W/4 which corresponds to half the bandwidth of coefficient signal $a_n$. The restricted bandwidth coefficient signal $a_{n/2}$ is obtained from low-pass filter 330.

To form the $b_{n/2}$ coefficient signal in accordance with Equation 18, the difference signal $(A_n - a_n)$ is formed in adder circuit 315. The square root of this difference signal is applied to sign change circuit 323 via square rooter circuit 319. Sign change circuit 323 is responsive to the signal $SG2_n$ from sign logic circuit 307 to adjust the sign of the signal $(A_n - a_n)^{\frac{1}{2}}$ from square rooter circuit 319 in accordance with the quadrant of signal $\Phi_{n/2}$ of Equation 16. Multiplier circuit 328 is responsive to the output of sign change circuit 323 and the signal $A_n/2$ from square rooter circuit 335 to form coefficient signal $b_{n/2}$ which signal is bandwidth restricted in low-pass filter 332. The bandwidth of coefficient signal $b_{n/2}$ is one-half the bandwidth of the $b_n$ coefficient signal since low-pass filter 332 provides a bandpass between zero and W/4.

Figure 11:
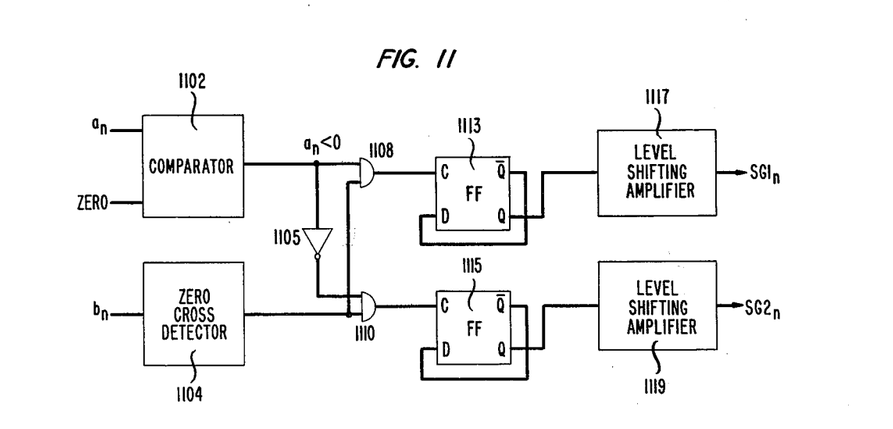
FIG. 11 shows a detailed block diagram of a circuit that may be used as the sign logic circuit of FIG. 1.

FIG. 11, shows a circuit that may be used as sign logic circuit 307. Referring to FIG. 11, signal $a_n$ is applied to one input of comparator 1102 in which it is compared to a zero valued signal. When signal $a_n$ is negative, the output of comparator 1102 is enabling, and the output of inverter 1105 is disabling. If signal $a_n$ is positive, AND-gate 1110 receives an enabling signal from inverter 1105 and AND-gate 1108 is disabled by the output of comparator 1102.

Zero crossing detector 1104 receives signal $b_n$ and provides a pulse each time signal $b_n$ changes sign, i.e., crosses the zero axis. If signal $a_n$ is negative and signal $b_n$ changes sign, the pulse from zero crossing detector 1104 passes through AND-gate 1108 and reverses the state of flip-flop 1113. Level shifting amplifier 1117 shifts the output of flip-flop 1113 so that signal $SG1_n$ from amplifier 1117 is either +1 or −1. When signal $a_n$ is positive and signal $b_n$ changes sign, the pulse obtained from zero crossing detector 1104 passes through AND-gate 1110 and reverses the state of flip-flop 1115. The output of flip-flop 1115 is modified in level shifting amplifier 1119 so that signal $SG2_n$ is either +1 or −1 as required by sign changer 323.

The $a_{n/2}$ and $b_{n/2}$ outputs of FIG. 3 are applied to the corresponding one of band signal former circuits 120-1 through 120-N. Each band signal former circuit is operative jointly responsive to signals $a_{n/2}$, $b_{n/2}$, and the constant amplitude sinusoid signals of frequency $\omega_n/2$ from generator 130 to shift the frequency of the reduced band coefficients to the appropriate section in the reduced bandwidth spectrum illustrated in FIG. 9. The circuit of FIG. 4 may be used to perform the frequency shifting operations required in circuits 120-1 through 120-N.

Figure 4:
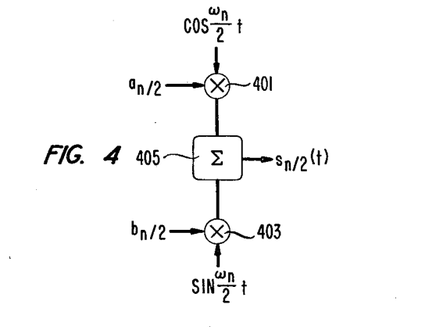
FIG. 4 shows a detailed block diagram of a circuit that may be used in the transmitter band signal formers of FIG. 1.

Referring to FIG. 4, the coefficient signal $a_{n/2}$ is applied to one input of multiplier circuit 401 while the coefficient signal $b_{n/2}$ is supplied to one input of multiplier 403. Multiplier 401 also receives a constant amplitude cosine signal of frequency $(\omega_n/2)t$. The output of multiplier 401 which has a center frequency of $\omega_n/2$ is supplied to one input of summing circuit 405. In similar manner, multiplier 403 is responsive to the constant amplitude sine wave signal from generator 130 and coefficient signal $b_{n/2}$ to provide the quadrature phase or imaginary component of the band signal with center frequency $\omega_n/2$ to summing circuit 405. The output of summing circuit 405 is the signal $s_{n/2}(t)$ of Equation 13.

Band former 120-1 provides signal $s_{\frac{1}{2}}(t)$ to summing circuit 125. Former circuit 120-N supplies signals $s_{N/2}(t)$ to the summing circuit and the band former intermediate circuits 120-2 and 120-N similarly supply band signals for $n = 2, 3, \ldots, N-1$ to the summing circuit. The output of circuit 125 is a signal representative of the lesser bandwidth short-term spectrum of speech signal $s(t)$. The reduced bandwidth is one-half the bandwidth of the short-term spectrum of speech signal $s(t)$. Advantageously, the output of summing circuit 125 is a single analog signal that may be transmitted with one-half the bandwidth of the speech signal applied to transducer 101.

The half-bandwidth signal $\hat{s}(t)$ from transmitter 110 is carried over communication channel 190 to receiver circuit 150. The receiver is operative to convert the received half-bandwidth signal to a replica of signal $s(t)$. In receiver 150, the reduced bandwidth signal is applied to band selector circuits 151-1 through 151-N. The band selector circuits are operative to partition the received signal into subbands having center frequencies $\omega_1/2$ through $\omega_N/2$ and to provide coefficient signals $a'_{\frac{1}{2}}$, $b'_{\frac{1}{2}}$ through $a'_{N/2}$. The outputs $a'_{\frac{1}{2}}$ and $b'_{\frac{1}{2}}$ from selector 151-1 are converted into full band coefficient signals $a'_1$ and $b'_1$ in coefficient converter circuit 155-1. The full band coefficient signals are then used in band signal former circuits 160-1 through 160-N to generate subband component signals $s'_1(t)$ through $s'_N(t)$. Signals $s'_1(t)$ through $s'_N(t)$ are then summed in circuit 165 to form a replica of the original speech signal. The replica signal $s(t)$ is converted into speech by electroacoustic transducer 170.

FIG. 5 shows a circuit that may be used as any of the band selector circuits 151-1 through 151-N. In FIG. 5, the signal from communication channel 190 is applied to multipliers 501 and 503. A constant amplitude cosine wave of frequency $\omega_n/2$ is supplied to multiplier 501 and a constant amplitude sine wave of the same frequency is applied to multiplier 503. The product signal from multiplier 501 represents the subband portion of the reduced bandwidth signal from communication channel 190 translated in frequency so that the band center $\omega_n/2$ is at frequency $\omega=0$. Low-pass filter 505 of bandpass between zero and W/4 selects the portion of the product signal from multiplier 501 that corresponds to the inphase coefficient signal $a'_{n/2}$. In similar manner, multiplier 503 and low-pass filter 507 provide the quadrature phase coefficient signal $b'_{n/2}$ having a bandpass between zero and W/4.

Figure 6:
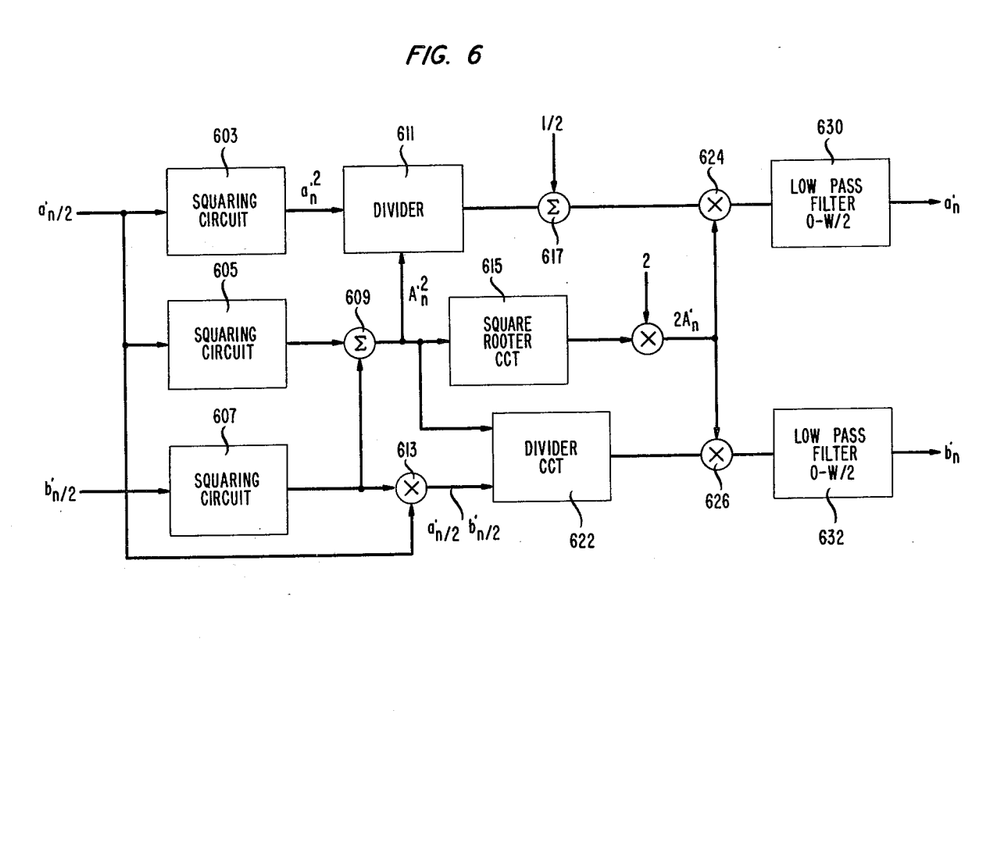
FIG. 6 shows a detailed block diagram of a circuit that may be used in the coefficient converter circuits of FIG. 1.

FIG. 6 shows a circuit that may be used as any one of coefficient converter circuits 155-1 through 155-N. In FIG. 6, coefficient signal $a'_{n/2}$ is applied to squaring circuit 603 and 605. Coefficient signal $b'_{n/2}$ is applied to squaring circuit 607. The signal $a'^2_{n/2}+b'^2_{n/2}$ is formed in summing circuit 609 and the product of the two coefficient signals $a'_{n/2} b'_{n/2}$ is produced by multiplier 613. The signal corresponding to Equation 25 is formed as a result of the operations of squaring circuit 603, divider 611, summing circuit 617 and multiplier circuit 624 as is well known in the art. The signal corresponding to Equation 26 is produced through the operation of multiplier circuit 613, divider circuit 622 and multiplication circuit 626. Filter 630 with passband between zero and W/2 insures that only the nth subband portion is included in coefficient signal $a'_n$. Low-pass filter 632 similarly insures that the $b'_n$ signal is restricted to the nth subband. The summing, multiplication, division, squaring, and square root operations required in the circuits of FIGS. 2-7, and 11 may be obtained through use of the Burr Brown, Type 4301 multifunction converter described on pages 4-59 through 4-78 of the *Burr Brown 1979 General Catalog*, copyrighted by Burr Brown Research Corporation, 1978.

Figure 7:
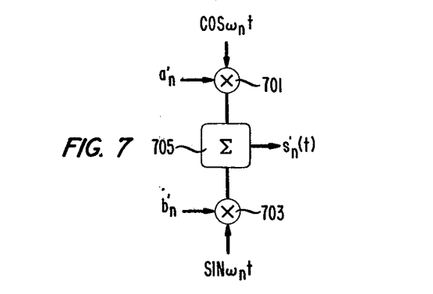
FIG. 7 shows a detailed block diagram of a circuit that may be used in the receiver band signal former circuits of FIG. 1.

The outputs of coefficient converter circuits 155-1 through 155-N are supplied to respective ones of band signal former circuits 160-1 through 160-N. In each band signal former circuit, $a'_n$ and $b'_n$ coefficient signals are combined to form a replica of the subband portion of the speech signal. A circuit adapted to perform the functions of band former circuits 160-1 through 160-N is shown in FIG. 7. Referring to FIG. 7, multiplier 701 receives the $a'_n$ signal from coefficient converter circuit 155-n while multiplier circuit 703 receives the $b'_n$ signal therefrom. The product signal $a'_n \cos \omega_n t$ is formed in multiplier 701 while the product signal $b'_n \sin \omega_n t$ is formed in multiplier 703. The outputs of multipliers 701 and 703 are summed in adder circuit 705 to form the nth subband portion of the replica signal $s'_n(t)$. All the subband portions $s'_1(t)$ through $s'_n(t)$ are summed in adder circuit 165 in which the replica signal $\bar{s}(t)$ is formed. The replica signal is converted into sound by transducer 170.

The invention has been shown and described with reference to a particular illustrative embodiment. It is to be understood that various modifications in form and detail may be made by those skilled in the art without departing from the spirit and scope of the invention. For example, the described embodiment utilizes analog circuitry for signal processing. The signals used in the embodiment, however, may be converted to coded digital form and digital processing circuitry well known in the art may be substituted for the described analog circuits. The compressed subband signals may be transmitted separately at low-bit rate. Additionally, the compressed bandwidth output signal from the transmitter circuit of FIG. 1 may be recorded using apparatus well known in the art and played back at different rates to effect a speed change in the speech without frequency distortion.

I claim:

1. A speech communication system comprising a transmitter including means for receiving an input speech signal; means for partitioning the input speech signal into a plurality of subband portions; means responsive to each partitioned subband portion of the input speech signal for generating a signal representative of said subband portion; and means for applying said subband portion representative signals to a communication channel;

characterized in that said subband portion signal generating means comprises means responsive to the subband portion of the input speech signal for producing a signal of bandwidth W/k representative of the short-term spectrum of said subband portion where W is the bandwidth of said subband portion and k is an integer, said W/k bandwidth subband portion representative signal producing means comprises means for dividing the instantaneous phase component of said speech signal subband portion by a signal corresponding to the integer k wherein the amplitude component of said speech signal subband portion is unaltered; and said subband portion signal applying means comprises means for summing the W/k bandwidth subband portion representative signals to form a signal of bandwidth $W_T/k$ representative of the short-term spectrum of said speech signal where $W_T$ is the bandwidth of said speech signal.

2. A speech communication system according to claim 1 wherein the integer signal $k=2$, the input speech signal partitioning means comprises n subband portion selecting means $n=1,2,\ldots,N$ each comprising means responsive to the input speech signal for forming an $a_n$ signal representative of the inphase component of the speech signal nth subband portion short-term spectrum and a $b_n$ signal representative of the quadrature phase component of the speech signal nth subband portion short-term spectrum; further characterized in that the input speech signal nth subband portion phase component dividing means comprises means responsive to said $a_n$ and $b_n$ signals for forming an $A_n=(a_n^2+b_n^2)^{\frac{1}{2}}$ signal representative of the amplitude of said nth subband portion short-term spectrum; means responsive to said $a_n$ and $b_n$ signals for forming a $(SGN)_a$ signal of unity absolute value which changes sign when said $a_n$ signal is negative and said $b_n$ signal changes sign and a $(SGN)_b$ of unit absolute value which changes sign when the $a_n$ signal is positive and the $b_n$ signal changes sign; and means jointly responsive to said $a_n$, $b_n$, $A_n$, $(SGN)_a$ and $(SGN)_b$ signals for generating a signal $$s_{n/2}(t) = (SGN)_a \sqrt{\frac{A_n}{2}} \sqrt{A_n + a_n} \cos\frac{\omega_n t}{2} + (SGN)_b \sqrt{\frac{A_n}{2}} \sqrt{A_n - a_n} \sin\frac{\omega_n t}{2}$$

representative of the input speech signal nth subband portion short-term spectrum where $\omega_n$ is the center frequency of the input speech signal nth subband portion.

3. A speech communication system according to claims 2, further comprising a receiver including; means connected to said communication channel for partitioning said first signal into subband portions thereof; and means responsive to the partitioned first signal subband portions for forming a replica of said speech signal; further
characterized in that
said replica forming means comprises means for converting each partitioned first signal subband portion signal of bandwidth W/k into a subband portion of said speech signal of bandwidth W; and means for combining the converted first signal subband portions to form said speech signal replica of bandwidth $W_T$.

4. A speech communication system according to claim 3 further
characterized in that
said converting means comprises means for modifying the phase component of said partitioned first signal subband portion.

5. A speech communication system according to claim 4 wherein said partitioned first signal subband portion phase component modifying means comprises means for multiplying the phase component of said partitioned first signal subband portion by a signal representative of k.

6. A speech signal communication system according to claim 1 wherein said integer k=2, said first signal partitioning means comprises n first signal subband selecting means n=1,2,..., N; each first signal subband selecting means comprising means responsive to the first signal for forming an $a'_{n/2}$ signal representative of the in-phase component of the first signal nth subband portion short-term spectrum and a $b'_{n/2}$ signal representative of the quadrature phase component of the first signal nth subband portion short-term spectrum; further
characterized in that
said multiplying means comprises means responsive to said $a'_{n/2}$ and $b'_{n/2}$ signals for generating an $$A'_n = (a'^2_{n/2} + b'^2_{n/2})^{\frac{1}{2}}$$

signal representative of the amplitude of the nth subband portion of said first signal; and means responsive to said $a'_{n/2}$, $b'_{n/2}$ and $A'_n$ signals for forming a signal $$s'_n(t) = 2A'_n \left[ \frac{a'^2_{n/2}}{A'^2_n} - \frac{1}{2} \right] \cos\omega_n t + 2A'_n \left[ \frac{a'_{n/2}b'_{n/2}}{A'^2_n} \right] \sin\omega_n t$$

representative of the nth subband portion of said input speech signal; and said converted first signal subband combining means comprises means for summing said $s'_n(t)$ signals to form a replica of said speech signal.

7. In a speech communication system, a method for processing a speech signal comprising the steps of: partitioning an input speech signal into a plurality of subband portions thereof; generating a signal representative of each subband portion; and applying said subband portion representative signals to a communication channel;
characterized in that
the generation of said subband portion representative signal includes producing a signal of bandwidth W/k representative of the short-term spectrum of said input speech signal subband portion where W is the bandwidth of the subband portion and k is an integer, producing of the W/k bandwidth subband portion representative signal comprises dividing the instantaneous phase component of the input speech signal subband portion by a signal corresponding to the integer k wherein the amplitude component of the input speech signal subband portion is unaltered; and applying the subband portions to said communication channel includes summing the W/k bandwidth subband portion representative signals to form a first signal of bandwidth $W_T/k$ representative of the short-term spectrum of the input speech signal where $W_T$ is the bandwidth of the input speech signal.

8. In a speech communication system, the method for processing a speech signal according to claim 1 wherein the integer signal k=2; the speech signal partitioning includes selecting n subband portions n=1,2,..., N of the input speech signal; each selection including forming an $a_n$ signal representative of the inphase component of the input speech signal nth subband portion short-term spectrum and a $b_n$ signal representative of the quadrature phase component of the input speech signal nth subband portion short-term spectrum; further
characterized in that
the dividing of the input speech signal nth subband portion phase component comprises forming an $A_n = (a_n^2 + b_n^2)^{\frac{1}{2}}$ signal representative of the amplitude of the nth subband portion short-term spectrum responsive to the $a_n$ and $b_n$ signals; forming an $(SGN)_a$ signal of unity absolute value which changes sign when said $a_n$ signal is negative and said $b_n$ signal changes sign responsive to said $a_n$ and $b_n$ signals; forming an $(SGN)_b$ signal of unity absolute value which changes sign when said $a_n$ signal is positive and said $b_n$ signal changes sign responsive to said $a_n$ and $b_n$ signals; generating a signal $$s_{n/2}(t) = (SGN)_a \sqrt{\frac{A_n}{2}} \sqrt{A_n + a_n} \cos\frac{\omega_n t}{2} + (SGN)_b \sqrt{\frac{A_n}{2}} \sqrt{A_n - a_n} \sin\frac{\omega_n t}{2}$$

representative of the input speech signal nth subband portion short-term spectrum responsive to said $a_n$, $b_n$, $(SGN)_a$, $(SGN)_b$, and $A_n$ signals where $\omega_n$ is the center frequency of the input speech signal nth subband portion.

9. In a speech communication system, a method for processing a speech signal according to claim 8 wherein the first signal from said communication channel is partitioned into subband portions thereof; and a replica of said input speech signal is formed responsive to the partitioned subband portions of the first signal; further
characterized in that
the replica forming includes converting each first signal subband portion signal of bandwidth W/k into a subband portion of said speech signal of bandwidth W; and combining the converted first signal subband portions to form said speech signal replica of bandwidth $W_T$.

10. In a speech communication system, a method for processing a speech signal according to claim 9 further characterized in that
converting the first signal subband portion comprises modifying the phase component of the first signal subband portion.

11. In a speech communication system, a method for processing a speech signal according to claim 10 further characterized in that
said first signal subband portion phase component modification comprises multiplying the phase component of said partitioned first signal subband portion by a signal representative of k.

12. In a speech communication system, a method for processing a speech signal according to claim 11 wherein said integer k=2, said first signal partitioning comprises selecting n first signal subband portions n=1,2, ... , N; each selection comprising forming an $a'_{n/2}$ signal representative of the inphase component of the first signal nth subband portion short-term spectrum and a $b'_{n/2}$ signal representative of the quadrature phase component of the first signal nth subband portion short-term spectrum further
characterized in that
said multiplying of the first signal nth subband portion phase component comprises generating an $A'_n = (a'^2_{n/2} + b'^2_{n/2})^{\frac{1}{2}}$ signal representative of the amplitude of the nth subband portion of the first signal responsive to said $a'_{n/2}$ and $b'_{n/2}$ signals; and forming a signal $$s'_n(t) = 2A'_n \left[ \frac{a'^2_{n/2}}{A'^2_n} - \tfrac{1}{2} \right] \cos\omega_n t + 2A'_n \left[ \frac{a'_{n/2} b'_{n/2}}{A'^2_n} \right] \sin\omega_n t$$

representative of the nth subband portion of the input speech signal; and said first signal subband portion combining comprises summing said $s'_n(t)$ signals to form a replica of said speech signal.

13. Apparatus for forming an expanded bandwidth signal from a received signal including means for partitioning the received signal into a plurality of subband portions; and means responsive to the received signal subband portions for forming the expanded bandwidth signal;
characterized in that
said expanded bandwidth signal forming means comprises means for converting each partitioned received signal subband portion of bandwidth W into a subband portion of said expanded bandwidth signal of bandwidth Wk where k is an integer, said Wk bandwidth subband converting means comprises means for multiplying the instantaneous phase component of said partitioned received signal subband portion by a signal representative of k, and means for combining said converted received signal subband portions to form said expanded bandwidth signal.

14. Apparatus for forming an expanded bandwidth signal from a reduced bandwidth received signal including means for partitioning the received signal into a plurality of reduced bandwidth subband portions; means responsive to each received signal reduced bandwidth subband portion for generating a signal representative of the subband portion; and means responsive to the subband portion representative signal for forming the expanded bandwidth signal;
characterized in that
said subband portion representative signal generating means comprises means responsive to the reduced bandwidth subband portion of the received signal for producing a signal of bandwidth Wk representative of the short-term spectrum of said subband portion where W is the bandwidth of said reduced bandwidth subband portion and k is an integer, said Wk bandwidth subband portion representative signal producing means comprises means for multiplying the instantaneous phase component of said received signal reduced bandwidth subband portion by a signal corresponding to the integer k; and said expanded bandwidth signal forming means comprises means for summing the Wk bandwidth subband portion representative signals to form a signal of bandwidth $W_T K$ representative of the short-term spectrum of said expanded bandwidth signal where $W_T$ is the reduced bandwidth of said received signal.

15. Apparatus as in claim 14 wherein said integer k=2, said received signal partitioning means comprises n received signal reduced bandwidth subband selecting means n=1,2, ... , N; each received signal reduced bandwidth subband selecting means comprising means responsive to the received signal for forming an $a'_{n/2}$ signal representative of the in phase component of the received signal nth reduced bandwidth subband portion short-term spectrum and a $b'_{n/2}$ signal representative of the quadrature phase component of the received signal nth reduced bandwidth subband portion short-term spectrum; further
characterized in that
said multiplying means comprises means responsive to said $a'_{n/2}$ and $b'_{n/2}$ signals for generating an $A'_n = (a'^2_{n/2} + b'^2_{n/2})^{\frac{1}{2}}$ signal representative of the amplitude of the nth reduced bandwidth subband portion of said received signal; and means responsive to said $a'_{n/2}$, $b'_{n/2}$ and $A'_n$ signals for forming a signal $$s'_n(t) = 2A'_n \left[ \frac{a'^2_{n/2}}{A'^2_n} - \tfrac{1}{2} \right] \cos\omega_n t + 2A'_n \left[ \frac{a'_{n/2} b'_{n/2}}{A'^2_n} \right] \sin\omega_n t$$

representative of the nth subband portion of the expanded bandwidth signal.

* * * * *

UNITED STATES PATENT AND TRADEMARK OFFICE
CERTIFICATE OF CORRECTION

PATENT NO. : 4,374,304

DATED : February 15, 1983

INVENTOR(S) : James L. Flanagan

It is certified that error appears in the above—identified patent and that said Letters Patent is hereby corrected as shown below:

Column 2, line 61, "s($\omega$,t)" should read --S($\omega$,t)--.
Column 3, line 34, "s(t)" should read --$\hat{s}$(t)--; line 36, "$\hat{s}$(t) should read --s(t)--.
Column 6, line 11, "circuit 100" should read --circuit 110--. Column 8, line 31, "s$_{\frac{1}{2}}$(t)" should read --s$_{1/2}$(t)--; line 52, "a'$_{\frac{1}{2}}$" should read --a'$_{1/2}$--; line 52, "b'$_{\frac{1}{2}}$" should read --b'$_{1/2}$--; line 53, "a'$_{N/2}$" should be changed to --a'$_{N/2}$, b'$_{N/2}$--; line 53, "a'$_{\frac{1}{2}}$" should read --a'$_{1/2}$--; line 53, "b'$_{\frac{1}{2}}$" should read --b'$_{1/2}$--.

In the Claims, column 10, line 54, "of unit" should read --signal of unity--.

UNITED STATES PATENT AND TRADEMARK OFFICE
CERTIFICATE OF CORRECTION

PATENT NO. : 4,374,304
DATED : February 15, 1983
INVENTOR(S) : James L. Flanagan It is certified that error appears in the above—identified patent and that said Letters Patent is hereby corrected as shown below:

Column 5, line 7, errors is identical to $$ \sum_n s_n(t) \, s_{n/2} = s'_{n/2} \cos\frac{\omega_n t}{2} + b'_{n/2} \sin\frac{\omega_n t}{2} \quad (19) $$

should read:

errors is identical to $-- \sum_n s_{n/2}(t)$.

$$ s'_{n/2} = a'_{n/2} \cos\frac{\omega_n t}{2} + b'_{n/2}\sin\frac{\omega_n t}{2} \quad (19) $$

Signed and Sealed this

Sixth Day of September 1983

[SEAL]

Attest:

GERALD J. MOSSINGHOFF

Attesting Officer     Commissioner of Patents and Trademarks